United States Patent
Gao et al.

(10) Patent No.: US 11,411,858 B2
(45) Date of Patent: *Aug. 9, 2022

(54) METHOD FOR UPDATING ROUTE IN NETWORK, NETWORK DEVICE, AND SYSTEM

(71) Applicant: HUAWEI TECHNOLOGIES CO., LTD., Guangdong (CN)

(72) Inventors: Qiangzhou Gao, Beijing (CN); Xudong Zhang, Beijing (CN); Wenxia Hou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,318

(22) Filed: Dec. 14, 2020

(65) Prior Publication Data
US 2021/0399976 A1 Dec. 23, 2021

Related U.S. Application Data

(63) Continuation of application No. 16/530,203, filed on Aug. 2, 2019, now Pat. No. 10,892,982, which is a (Continued)

(30) Foreign Application Priority Data

Feb. 4, 2017 (CN) .......................... 201710064404.0

(51) Int. Cl.
*H04L 45/00* (2022.01)
*H04L 45/02* (2022.01)
*H04L 45/12* (2022.01)

(52) U.S. Cl.
CPC .............. *H04L 45/20* (2013.01); *H04L 45/02* (2013.01); *H04L 45/123* (2013.01); *H04L 45/26* (2013.01)

(58) Field of Classification Search
None
See application file for complete search history.

(56) References Cited

U.S. PATENT DOCUMENTS

| 210,167 A | 11/1878 | Thomas |
| 1,210,167 A | 12/1916 | Heyer |

(Continued)

FOREIGN PATENT DOCUMENTS

| CN | 1486045 A | 3/2004 |
| CN | 1949740 A | 4/2007 |

(Continued)

OTHER PUBLICATIONS

J_ Moy, OSPF Version 2. rfc2328 , Apr. 1998, 244 pages.

*Primary Examiner* — Anh Vu H Ly
(74) *Attorney, Agent, or Firm* — Womble Bond Dickinson (US) LLP

(57) ABSTRACT

This application provides a method for updating a route in a network. The first network device sends a first LSA packet to a third network device, so that the third network device generates a first route whose destination address is a second IP address, where a next-hop IP address of the first route is the IP address of the first network device, and the second IP address belongs to the IP network segment corresponding to the first IP address which is an IP address of the first network device. The first network device sends a second LSA packet to the third network device when determining that switching needs to be performed on a next hop of a route in the third network device, whose destination address belongs to the IP network segment, and whose next-hop IP address is the first IP address.

20 Claims, 6 Drawing Sheets

Related U.S. Application Data continuation of application No. PCT/CN2018/073643, filed on Jan. 22, 2018.

(56) References Cited

U.S. PATENT DOCUMENTS

| | | | |
|---|---|---|---|
| 6,473,421 | B1 | 10/2002 | Tappan |
| 6,985,959 | B1 | 1/2006 | Lee |
| 2003/0072485 | A1* | 4/2003 | Guerin ............... H04N 19/184 382/166 |
| 2006/0133390 | A1 | 6/2006 | Sreekantiah et al. |
| 2007/0214275 | A1 | 9/2007 | Mirtorabi et al. |
| 2008/0205401 | A1 | 8/2008 | Mirtorabi et al. |
| 2009/0154340 | A1 | 6/2009 | Kumaresan et al. |
| 2010/0287128 | A1 | 11/2010 | Baltatu et al. |
| 2012/0099858 | A1 | 4/2012 | Moore et al. |
| 2012/0144066 | A1 | 6/2012 | Medved et al. |
| 2013/0148495 | A1 | 6/2013 | Zhang et al. |
| 2015/0092785 | A1 | 4/2015 | Torvi |
| 2017/0207963 | A1 | 7/2017 | Mehta et al. |
| 2017/0317919 | A1* | 11/2017 | Fernando ............ H04L 61/103 |

FOREIGN PATENT DOCUMENTS

| | | |
|---|---|---|
| CN | 101466126 A | 6/2009 |
| CN | 103516612 A | 1/2014 |
| CN | 104038427 A | 9/2014 |
| CN | 106878186 A | 6/2017 |
| WO | 0106717 A1 | 1/2001 |
| WO | 007041926 A1 | 4/2007 |

\* cited by examiner

METHOD FOR UPDATING ROUTE IN NETWORK, NETWORK DEVICE, AND SYSTEM

CROSS-REFERENCE TO RELATED APPLICATIONS

This application is a continuation of U.S. patent application Ser. No. 16/530,203, filed on Aug. 2, 2019, which is a continuation of International Application No. PCT/CN2018/073643, filed on Jan. 22, 2018, which claims priority to Chinese Patent Application No. 201710064404.0, filed on Feb. 4, 2017. All of the aforementioned applications are hereby incorporated by reference in their entireties.

TECHNICAL FIELD

This application relates to the field of communications technologies, and in particular, to a method for updating a route in a network, a network device, and a system.

BACKGROUND

An Open Shortest Path First (English: Open Shortest Path First, OSPF) protocol is used in a single autonomous system (English: Autonomous System, AS). In an entire network, each router sets up an OSPF neighbor relationship and sends, to all neighbors, a link state advertisement (English: Link State Advertisement, LSA) packet generated by the router. The OSPF advertises a network interface state between the routers and sets up a link-state database. Each router calculates a shortest-path tree based on the link-state database, to generate a routing table.

In an OSPF network area, an autonomous system boundary router (English: Autonomous System Boundary Router, ASBR) leads a route of an external network to the OSPF, generates an AS external LSA (English: AS-external-LSA) packet, and sends the AS external LSA packet to a router in the OSPF network area. Generally, the router in the OSPF network area communicates with the external network by using the ASBR. In the related art, when the router in the OSPF network area is triggered to update a route, the ASBR needs to age, one by one, AS-external-LSA packets advertised by the ASBR, and advertises aging information to its connected router in the OSPF network area, to update the route.

However, in the prior art, if the ASBR is connected to routers in a plurality of network segments, the ASBR cannot flexibly enable its connected router in the OSPF network area to update a route without changing a link from the ASBR to the external network. If there are a relatively large quantity of routers in the network area, a maximum transmission unit (English: Maximum Transmission Unit, MTU) in an interface connecting the ASBR and the routers in the OSPF network area is 1500 bytes, and a bandwidth of 0.373 bps needs to be occupied for sending one AS-external-LSA packet, the ASBR needs to send at least 2700 packets to notify its connected routers in the OSPF network area of all aging information when 100,000 routes need to be updated on the routers in the OSPF network area. In this process, a large quantity of network bandwidths need to be occupied, and a large amount of time needs to be consumed. Consequently, it takes an excessively long time to update the routes, and packet loss occurs.

SUMMARY

Embodiments of this application provide a method for updating a route in a network, a network device, and a system, to resolve prior-art technical problems that a route update occupies a large quantity of bandwidths and consumes a large amount of time.

According to a first aspect, an embodiment of this application provides a method for updating a route in a network, where the network includes a first network device, a second network device, and a third network device, the third network device is connected to the first network device and the second network device, and the method includes:

setting up, by the first network device, a correspondence between an IP (English: Internet Protocol, Internet Protocol) network segment and a first IP address, where the first IP address is an IP address of the first network device; sending, by the first network device, a first LSA packet to the third network device, where the first LSA packet includes the second IP address, the first LSA packet is used to trigger the third network device to generate a first route whose destination address is the second IP address, the second IP address belongs to the IP network segment, and a next-hop IP address of the first route is the first IP address; and sending, by the first network device, a second LSA packet to the third network device when the first network device determines that switching needs to be performed on a next hop of a route that is stored in the third network device, whose destination IP address belongs to the IP network segment, and whose next-hop IP address is the first IP address, where the second LSA packet includes the first IP address, the second LSA packet is used to trigger the third network device to update, from the first IP address to a third IP address, the next-hop IP address of the first route, and the third IP address is an IP address of the second network device.

In the foregoing solution, the first network device sends the first LSA packet to the third network device, so that the third network device generates the first route whose destination address is the second IP address, where the next-hop IP address of the first route is the IP address of the first network device, and the second IP address belongs to the IP network segment. The first network device sends the second LSA packet to the third network device when determining that switching needs to be performed on the next hop of the route that is in the third network device, whose destination address belongs to the IP network segment, and whose next-hop IP address is the first IP address, so that the third network device switches, to the IP address of the second network device, the next-hop IP address of the route whose next-hop IP address is the first IP address. In this way, one LSA packet can be sent to enable the third network device to switch, from the first network device to the second network device, the next hop of the route belonging to the IP network segment, and there is no need to send an LSA packet for each to-be-updated route. This avoids occupation of excessive bandwidths during a route update and improves a speed of the route update.

In a possible design, the method further includes:

sending, by the first network device, a third LSA packet to the third network device, where the third LSA packet includes the first IP address, and the third LSA packet is used to trigger the third network device to generate a route whose destination address is the first IP address; and that the second LSA packet is used to trigger the third network device to update, from the first IP address to a third IP address, the next-hop IP address of the first route includes:

the second LSA packet is used to instruct the third network device to delete the route whose destination address is the first IP address, to trigger the third network device to update the first route whose next-hop IP address is the first IP address, so that the next-hop IP address of the first route is updated from the first IP address to the third IP address, where the third network device stores a route whose destination address is the third IP address.

In the foregoing solution, the first network device sends the second LSA packet to the third network device when determining that switching needs to be performed on the next hop of the route that is in the third network device, whose destination address belongs to the IP network segment, and whose next-hop IP address is the first IP address, so that the third network device switches, to the IP address of the second network device, the next-hop IP address of the route whose next-hop IP address is the first IP address. In this way, one LSA packet is sent to enable the next hop of the route belonging to the IP network segment to switch from the first network device to the second network device, and there is no need to send an LSA packet for each to-be-updated route. This avoids occupation of excessive bandwidths during a route update and improves a speed of the route update.

In a possible design, the first IP address is an IP address of a logical interface of the first network device, and a forwarding address in the first LSA packet is the first IP address.

In the foregoing solution, the first IP address may be the IP address of the logical interface of the first network device.

In a possible design, after the sending, by the first network device, the second LSA packet to the third network device, the method further includes:

sending, by the first network device to the third network device when the first LSA packet is stored in a link-state database for a time length reaching a maximum age (English: MaxAge), a packet for deleting the first LSA packet, so that the third network device deletes the stored first LSA packet.

In the foregoing solution, after sending the second LSA packet, the first network device may continue to perform an aging operation on the first LSA packet, to delete the first LSA packet, thereby saving storage space.

According to a second aspect, an embodiment of this application provides a route switching method in a network, where the network includes a first network device, a second network device, and a third network device, the third network device is connected to the first network device and the second network device, a correspondence between an IP network segment and a first IP address is set up by the first network device, and the first IP address is an IP address of the first network device, and the method includes:

receiving, by the third network device, a first LSA packet sent by the first network device, where the first LSA packet includes a second IP address, and the second IP address belongs to the IP network segment; and generating, by the third network device based on the first LSA packet, a first route whose destination address is the second IP address, and a next-hop IP address of the first route is the first IP address; receiving, by the third network device, a second LSA packet sent by the first network device, where the second LSA packet is sent to the third network device when the first network device determines that switching needs to be performed on a next hop of a route that is stored in the third network device, whose destination IP address belongs to the IP network segment, and whose next-hop IP address is the first IP address, and the second LSA packet includes the first IP address; and updating, by the third network device from the first IP address to a third IP address, the next-hop IP address of the first route based on the second LSA packet, where the third IP address is an IP address of the second network device.

In the foregoing solution, the third network device rapidly switches, to the IP address of the second network device based on the second LSA packet, the next hop of the route whose destination IP address belongs to the IP network segment and whose next-hop IP address is the first IP address. This avoids occupation of excessive bandwidths during a route update and improves a speed of the route update.

In a possible design, the method further includes:

receiving, by the third network device, a third LSA packet sent by the first network device, where the third LSA packet includes the first IP address; and generating, by the third network device based on the third LSA packet, a route whose destination address is the first IP address; and the updating, by the third network device from the first IP address to a third IP address, the next-hop IP address of the first route based on the second LSA packet includes:

receiving, by the third network device, a fourth LSA packet sent by the second network device, where the fourth LSA packet includes the third IP address; and generating, by the third network device based on the fourth LSA packet, a route whose destination address is the third IP address; and updating, by the third network device based on the second LSA packet, the first route whose next-hop IP address is the first IP address, so that the next-hop IP address of the first route is updated from the first IP address to the third IP address.

In a possible design, the first IP address is an IP address of a logical interface of the first network device, and a forwarding address in the first LSA packet is the first IP address.

According to a third aspect, an embodiment of this application provides a first network device, where the first network device, a second network device, and a third network device are in a same network, the third network device is connected to the first network device and the second network device, and the first network device includes:

a processing unit, configured to set up a correspondence between an IP network segment and a first IP address, where the first IP address is an IP address of the first network device; and a sending unit, configured to send a first LSA packet to the third network device, where the first LSA packet includes the second IP address, the first LSA packet is used to trigger the third network device to generate a first route whose destination address is the second IP address, the second IP address belongs to the IP network segment, and a next-hop IP address of the first route is the first IP address.

The processing unit is configured to determine whether switching needs to be performed on a next hop of a route that is stored in the third network device, whose destination IP address belongs to the IP network segment, and whose next-hop IP address is the first IP address.

The sending unit is configured to send a second LSA packet to the third network device when the processing unit determines that switching needs to be performed on the next hop of the route that is stored in the third network device, whose destination IP address belongs to the IP network segment, and whose next-hop IP address is the first IP address, where the second LSA packet includes the first IP address, the second LSA packet is used to trigger the third network device to update, from the first IP address to a third IP address, the next-hop IP address of the first route, and the third IP address is an IP address of the second network device.

In a possible design, the following is further included:

the sending unit is further configured to send a third LSA packet to the third network device, where the third LSA packet includes the first IP address, and the third LSA packet is used to trigger the third network device to generate a route whose destination address is the first IP address; and correspondingly, the second LSA packet is used to instruct the third network device to delete the route whose destination address is the first IP address, to trigger the third network device to update the first route whose next-hop IP address is the first IP address, so that the next-hop IP address of the first route is updated from the first IP address to the third IP address, where the third network device stores a route whose destination address is the third IP address.

According to a fourth aspect, an embodiment of this application provides a first network device. The first network device includes a processor, a network interface, and a memory. The memory may be configured to store program code and data of the network device. The processor is configured to invoke a program instruction from the memory to perform the method in the designs in the foregoing aspects. For a specific execution step, refer to the foregoing aspects. Details are not described herein again.

According to a fifth aspect, an embodiment of this application provides a third network device, where the third network device, a first network device, and a second network device are in a same network, the third network device is connected to the first network device and the second network device, a correspondence between an Internet Protocol IP network segment and a first IP address is set up by the first network device, the first IP address is an IP address of the first network device, and the third network device includes:

a receiving unit, configured to: receive a first LSA packet sent by the first network device, where the first LSA packet includes a second IP address, the second IP address belongs to the Internet Protocol IP network segment; and receive a second LSA packet sent by the first network device, where the second LSA packet is sent to the third network device when the first network device determines that switching needs to be performed on a next hop of a route that is stored in the third network device, whose destination IP address belongs to the IP network segment, and whose next-hop IP address is the first IP address, and the second LSA packet includes the first IP address; and a processing unit, configured to generate, based on the first LSA packet, a first route whose destination address is the second IP address, and a next-hop IP address of the first route is the first IP address, and update, from the first IP address to a third IP address, the next-hop IP address of the first route based on the second LSA packet, where the third IP address is an IP address of the second network device.

In a possible design, the following is further included:

the receiving unit is further configured to receive a third LSA packet sent by the first network device, where the third LSA packet includes the first IP address; and the processing unit is further configured to generate, based on the third LSA packet, a route whose destination address is the first IP address;

the receiving unit is further configured to receive a fourth LSA packet sent by the second network device, where the fourth LSA packet includes the third IP address; and the processing unit is further configured to generate, based on the fourth LSA packet, a route whose destination address is the third IP address.

According to a sixth aspect, an embodiment of this application provides a third network device. The third network device includes a processor, a network interface, and a memory. The memory may be configured to store program code and data of the network device. The processor is configured to invoke a program instruction from the memory to perform the method in the designs in the foregoing aspects. For a specific execution step, refer to the foregoing aspects. Details are not described herein again.

According to a seventh aspect, an embodiment of this application discloses a network system, including: the first network device disclosed in the third aspect or the fourth aspect, a second network device, and the third network device disclosed in the fifth aspect or the sixth aspect.

The third network device is connected to the first network device and the second network device.

The first network device is configured to: set up a correspondence between an IP network segment and a first IP address, where the first IP address is an IP address of the first network device; send a first LSA packet to the third network device, where the first LSA packet includes the second IP address, the first LSA packet is used to trigger the third network device to generate a first route whose destination address is the second IP address, the second IP address belongs to the IP network segment, and a next-hop IP address of the first route is the first IP address; and send a second LSA packet to the third network device when determining that switching needs to be performed on a next hop of a route that is stored in the third network device, whose destination IP address belongs to the IP network segment, and whose next-hop IP address is the first IP address, where the second LSA packet includes the first IP address, the second LSA packet is used to trigger the third network device to update, from the first IP address to a third IP address, the next-hop IP address of the first route, and the third IP address is an IP address of the second network device.

The third network device is configured to: receive the first LSA packet sent by the first network device; generate, based on the first LSA packet, the first route whose destination address is the second IP address, where the next-hop IP address of the first route is the first IP address; receive the second LSA packet sent by the first network device; and update, from the first IP address to the third IP address, the next-hop IP address of the first route based on the second LSA packet, where the third IP address is the IP address of the second network device.

The second network device is configured to forward a packet sent by the third network device.

According to an eighth aspect, an embodiment of this application provides a non-volatile computer readable storage medium configured to store a computer program, where the computer program includes an instruction used to perform the method in the first aspect, the second aspect, any possible design in the first aspect, or any possible design in the second aspect.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description merely show some embodiments of this application, and persons of ordinary skill in the art may derive other drawings from the provided accompanying drawings without creative efforts.

DESCRIPTION OF EMBODIMENTS

The following describes the embodiments of the present invention with reference to accompanying drawings.

In the embodiments, claims, and accompanying drawings of this application, the terms "first", "second", "third", "fourth", and the like are intended to distinguish between different objects, but not to indicate a particular order. In addition, the terms "include" and "have" are not exclusive. For example, the process, method, system, product, or device that includes a series of steps or units is not limited to the listed steps or units, but may further include a step or a unit that is not listed.

The network device mentioned in the embodiments of this application may be a router or may be a network device with a same or similar function, such as a switch.

The embodiments of this application are described by using an OSPF protocol as an example. The OSPF protocol may also be referred to as a link state routing protocol. A network device configured with the OSPF protocol may obtain all information of other network devices to create a network topology structure, and select, in the topology structure, an optimal path that reaches each destination network. In an entire OSPF network, each router sends, to all neighbors by setting up a neighbor relationship, an LSA packet generated by the router. The OSPF advertises a network interface state between the routers and sets up a link-state database. In the OSPF protocol, a topology structure in an OSPF network area may be described by using the link-state database, and network devices in a same OSPF network area have a same link-state database. Each router in the OSPF network calculates a shortest-path tree based on the link-state database, to generate a routing table.

In the OSPF network area, a router in the area communicates with an external network by using a router that acts as an ASBR. A route update is required when a network topology structure of the router in the area changes. The route update indicates updating content of the routing table after the network topology structure changes. A route convergence is caused by the change of the network topology and is a behavior of re-calculating a route to find an alternative route. Therefore, both the route update and the route convergence may be referred to as route switching. The route update can enable all routers in a routing domain to achieve consistency in terms of a current network structure and route forwarding.

Figure 1:
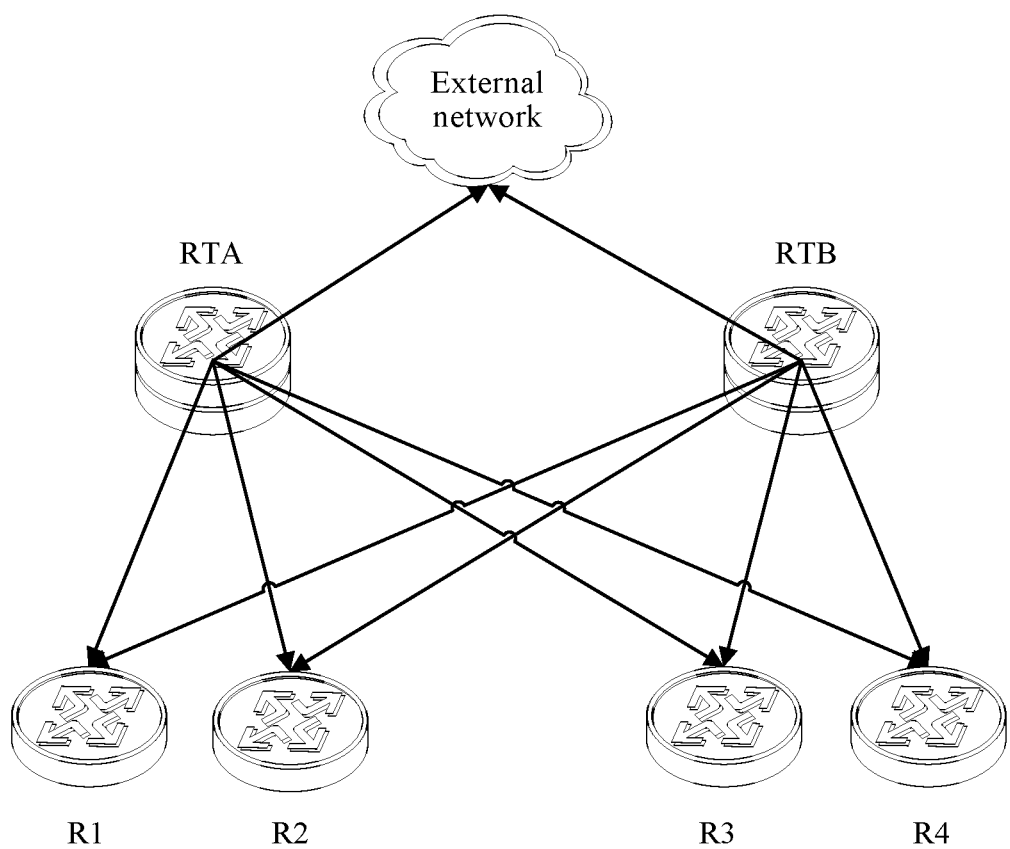
FIG. 1 is a schematic structural diagram of a network system according to an embodiment of this application.

FIG. 1 is a schematic structural diagram of a network system according to an embodiment of this application. The network system includes: an RTA, an RTB, an R1, an R2, an R3, and an R4.

The RTA and the RTB are ASBRs. The R1, the R2, the R3, and the R4 are routers in an OSPF network area.

The RTA and the RTB respectively lead routes of an external network to OSPF routing tables of the RTA and the RTB, and respectively generate AS-external-LSA packets and send the AS-external-LSA packets to the R1, the R2, the R3, and the R4. In addition, the RTA, the RTB, the R1, the R2, the R3, and the R4 each generate one router link state advertisement (English: Router-LSA) packet and send the router link state advertisement packet to all neighbors.

In an OSPF network, different types of LSAs are defined in an OSPF protocol based on different functions of the LSAs.

Figure 2:
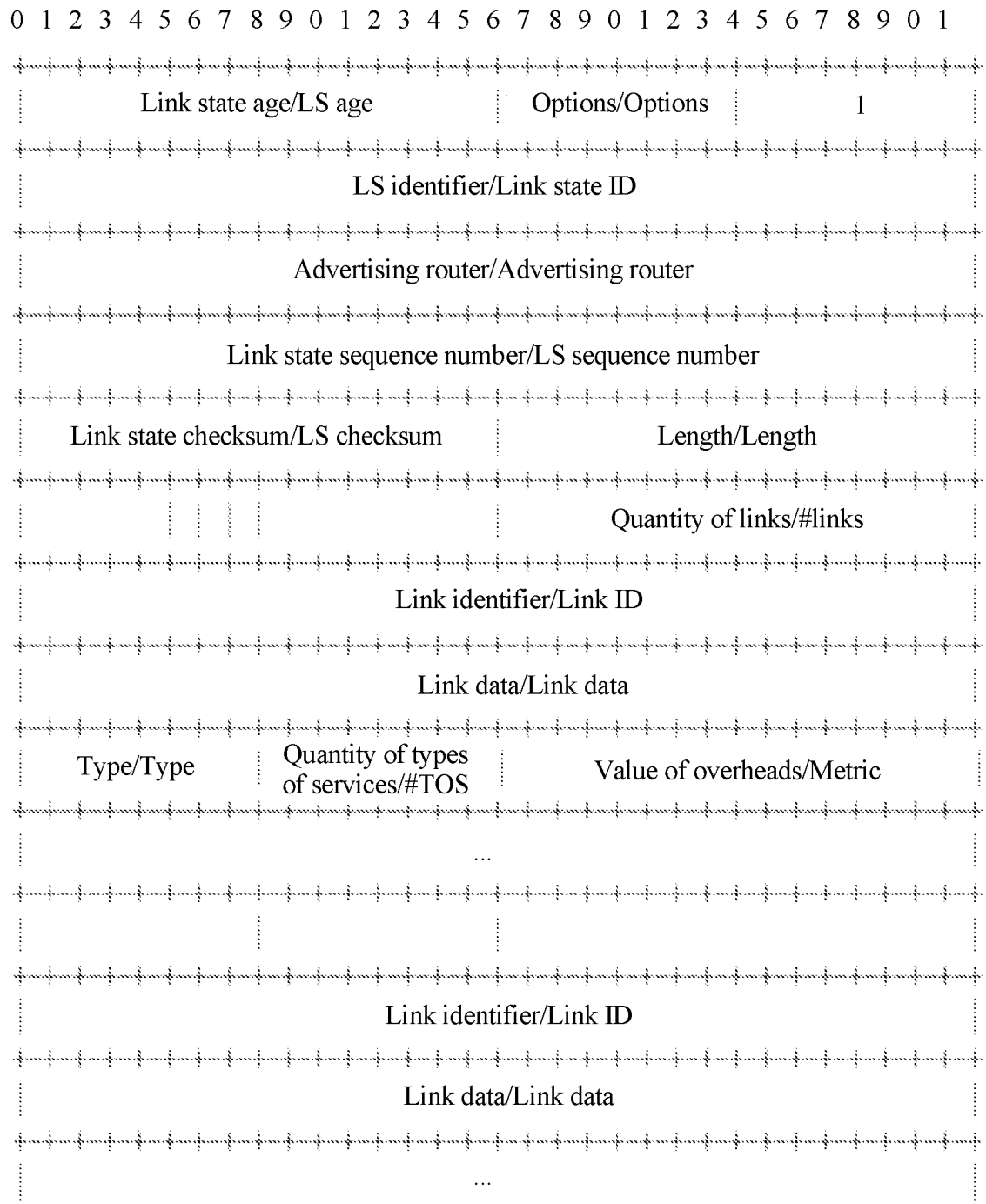
FIG. 2 is a schematic diagram of a format of a Router-LSA packet according to an embodiment of this application.

The Router-LSA is a type 1 LSA. The Router-LSA packet is used to describe a link state and a distance value of the routers in the OSPF network area, and flooding is performed only in one OSPF network area. A format of the Router-LSA packet is shown in FIG. 2.

The Router-LSA packet includes an LSA packet header and content of the Router-LSA packet.

Fields shown in the LSA packet header have the following meanings:

LS age (link state age) field: Used to identify a time that passes by after the LSA is generated.

Options (options) field.

LS type (link state type) field, Link State ID (link state identifier) field, and LS sequence number (link state sequence number) field: Used together to determine whether these three fields describe a same LSA.

Link State ID field in the Router-LSA: Set as an OSPF router identifier.

Advertising router (advertising router) field: Used to identify a router that originates the LSA packet.

LS checksum (link state checksum) field: Used to identify a checksum of fields other than the LS age field.

Length (length) field: Used to identify a total length of the LSA packet, including the LSA packet header.

Fields shown in the content of the Router-LSA packet have the following meanings:

links (quantity of links) field: Used to identify a quantity of pieces of link information described in the LSA packet, including information of all links and interfaces of a router in a specific area.

Link ID (link identifier) field: Used to identify a target connected to a router.

Link Data (link data) field: Used to identify link data. A value of this field depends on a link type.

Type (type) field: Used to describe a type of an interface network connected to a router. Four link types are described in the Router-LSA packet: A first type is a point-to-point link to another router; a second type is a link to a transit network; a third type is a link to a stub network; and a fourth type is a virtual link.

TOS (quantity of types of services) field: Used to identify a quantity of different TOSs given for a link.

Metric (a value of overheads) field: Used to identify a value of overheads of a link.

Figure 3:
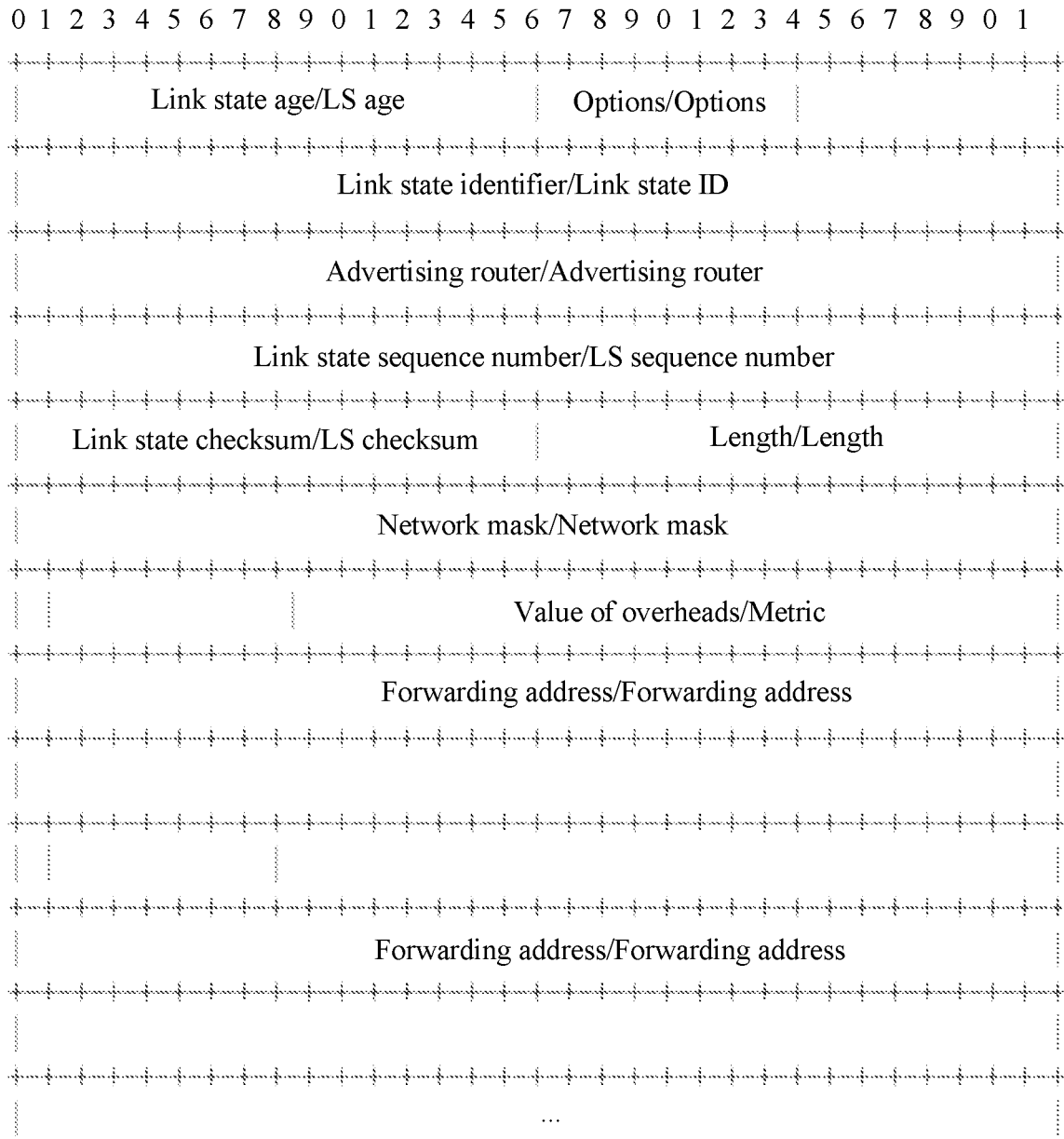
FIG. 3 is a schematic diagram of a format of an AS-external-LSA packet according to an embodiment of this application.

The AS-external-LSA is a type 5 LSA. The AS-external-LSA packet is used to describe a route from a router to an external network of an AS, and flooding is performed in the entire AS. A format of the AS-external-LSA packet is shown in FIG. 3. The AS-external-LSA packet includes an LSA packet header and content of the AS-external-LSA packet.

In the AS-external-LSA packet, a link state ID field in the LSA packet header is used to identify a destination prefix address advertised by the router to another router. Meanings of other fields in the LSA packet header are the same as meanings of same fields shown in FIG. 2. Details are not described herein again.

Fields shown in the content of the AS-external-LSA packet have the following meanings:

Network Mask (network mask) field: Used to identify a mask of the advertised destination prefix address.

Forwarding address (forwarding address) field: Used to identify an address to which a packet sent to the advertised destination prefix address is forwarded.

Figure 4:
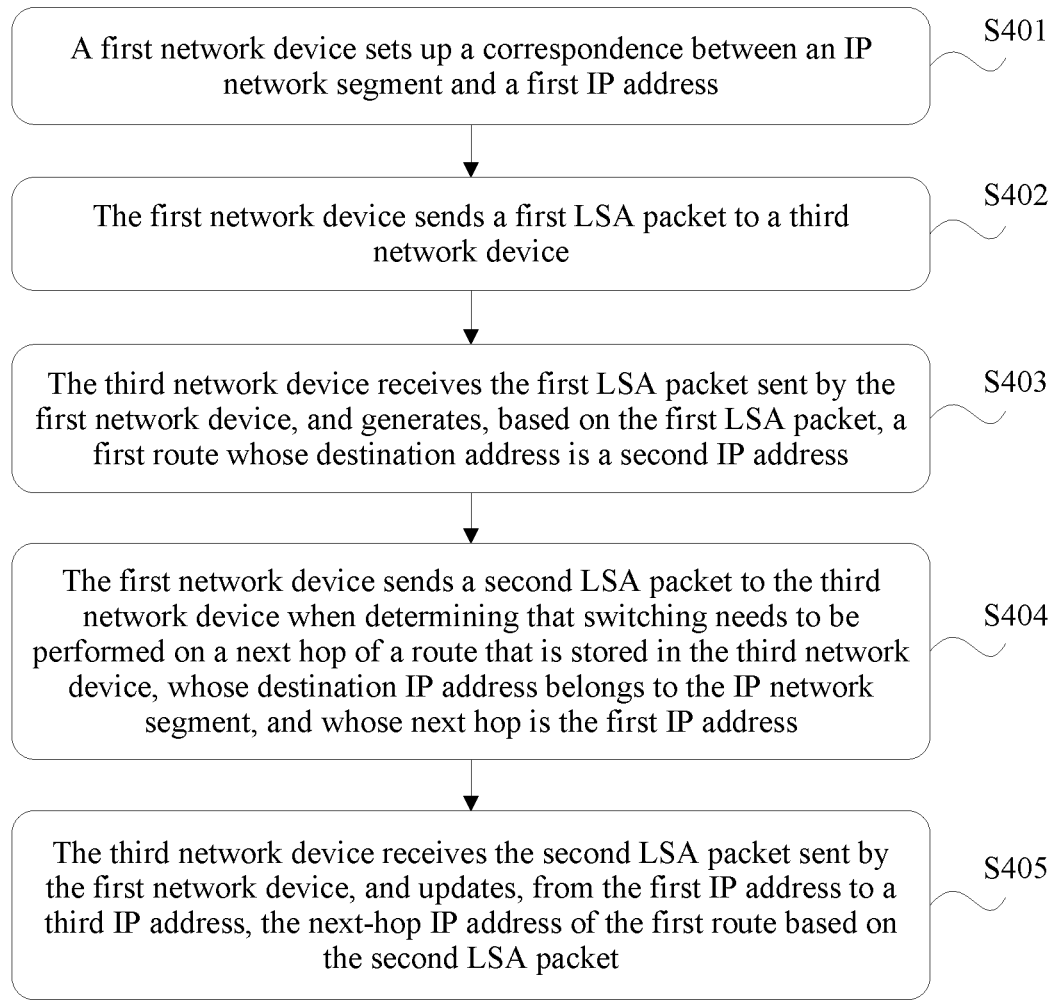
FIG. 4 is a schematic flowchart of a method for updating a route in a network according to an embodiment of this application.

Based on the schematic diagram of the application scenario shown in FIG. 1, FIG. 4 is a schematic flowchart of a method for updating a route in a network according to an embodiment of this application. The network includes a first network device, a second network device, and a third network device. The third network device is connected to the first network device and the second network device.

The connection between the third network device and the first network device and the connection between the third network device and the second network device may be physical connections or may be protocol-based connections. For example, if a distance between the third network device and the first network device and a distance between the third network device and the second network device are relatively short, the connections may be made by using physical links. If a distance between the third network device and the first network device and a distance between the third network device and the second network device are relatively long, for example, the third network device and the first network device are not in a same city or the third network device and the second network device are not in a same city, the connections may be set up by using an OSPF protocol.

The method for updating a route in a network includes:

S401: The first network device sets up a correspondence between an IP network segment and a first IP address.

The first IP address is an IP address of the first network device.

For example, the first network device may be the RTA or the RTB shown in FIG. 1, and the IP address of the first network device is 1.1.1.1. An external network connected to the RTA or the RTB has three IP network segments. A route prefix address of a first IP network segment is 10.1.0.0. A route prefix address of a second IP network segment is 10.2.0.0. A route prefix address of a third IP network segment is 10.3.0.0.

For example, the first network device sets up a correspondence between the IP address 1.1.1.1 and the route prefix address 10.1.0.0 of the first IP network segment.

S402: The first network device sends a first LSA packet to the third network device.

The first LSA packet includes a second IP address. The first LSA packet is used to trigger the third network device to generate a first route whose destination address is the second IP address. A next-hop IP address of the first route is the first IP address.

Optionally, there may be one or more first LSA packets.

The second IP address belongs to the IP network segment. For example, if the IP network segment is the first IP network segment, the second IP address may be an address belonging to the first IP network segment, such as 10.1.1.1, 10.1.2.0, or the like. If the IP network segment is the second IP network segment, the second IP address may be an address belonging to the second IP network segment, such as 10.2.0.0, 10.2.1.1, or the like. If the IP network segment is the third IP network segment, the second IP address may be an address belonging to the third IP network segment, such as 10.3.0.0, 10.3.2.1, or the like.

For example, if the first IP address is 1.1.1.1, the first network device sets up a correspondence between the first IP address 1.1.1.1 and the first IP network segment. If the second IP address belongs to the first IP network segment, for example, the second IP address is 10.1.9.9, the first network device also sets up a correspondence between the first IP address and the second IP address.

For example, when the first network device is the RTA shown in FIG. 1, the first LSA packet is a first AS-external-LSA packet. Based on the format of the AS-external-LSA packet shown in FIG. 3, when generating a corresponding AS-external-LSA packet based on the correspondence that is set up between the IP network segment and the first IP address, the first network device sets a forwarding address field in the first AS-external-LSA packet to 1.1.1.1.

S403: The third network device receives the first LSA packet sent by the first network device, and generates, based on the first LSA packet, a first route whose destination address is a second IP address.

The third network device generates, based on the received first LSA packet, the first route whose destination address is the second IP address. A next-hop IP address of the first route is the first IP address.

Optionally, if the first LSA packet received by the third network device includes a plurality of LSA packets, a corresponding quantity of routes are generated. All next-hop IP addresses of the generated routes are the first IP address.

For example, the third network device may be the R1, the R2, the R3, or the R4 shown in FIG. 1. Based on the foregoing example, if the first network device is the RTA shown in FIG. 1, the third network device is the R1, and the first LSA packet is the first AS-external-LSA packet, for the first route generated by the R1, a destination IP address of the first route is 10.1.9.9, and a next-hop IP address is 1.1.1.1. During packet forwarding, first, the R1 sends a packet whose destination IP address is 10.1.9.9 to the RTA whose IP address is 1.1.1.1, and then the RTA forwards the packet to a network device whose IP address is 10.1.9.9.

S404: The first network device sends a second LSA packet to the third network device when determining that switching needs to be performed on a next hop of a route that is stored in the third network device, whose destination IP address belongs to the IP network segment, and whose next-hop IP address is the first IP address.

The first network device sends the second LSA packet to the third network device when detecting that a packet forwarding function of the first network device is faulty, or when detecting that a CPU usage of the first network device exceeds a specific threshold, or when detecting that a bandwidth usage of the first network device exceeds a specific threshold.

The second LSA packet includes the first IP address. The second LSA packet is used to trigger the third network device to update, from the first IP address to a third IP address, the next-hop IP address of the first route. The third IP address is an IP address of the second network device.

For example, if the first network device is the RTA shown in FIG. 1, the second network device is the RTB shown in FIG. 1. Route prefixes of three IP network segments connected to the first network device and the second network device are 10.1.0.0, 10.2.0.0, and 10.3.0.0. The first network device sets up a correspondence between the first IP address and the route prefix 10.1.0.0, and the second LSA packet generated by the first network device is a first Router-LSA packet.

When the RTA generates the first Router-LSA packet, a quantity in a #links field is 1. When a correspondence is set up between an IP address of the RTA and an IP network segment whose route prefix is 10.1.0.0, the IP address of the RTA corresponds to a section of packet content that includes a link ID field, a link data field, a type field, a #TOS field, and a metric field.

S405: The third network device receives the second LSA packet sent by the first network device, and updates, from the first IP address to a third IP address, the next-hop IP address of the first route based on the second LSA packet.

The third IP address is an IP address of the second network device. Based on the foregoing example, if the first network device is the RTA shown in FIG. 1, the second network device is the RTB shown in FIG. 1, the third network device is the R1, and the first IP address is 1.1.1.1. If the third IP address is 4.4.4.4, the third network device updates, from the first IP address to the third IP address, the next-hop IP address of the first route based on the second LSA packet, and in a specific application example, updates, from 1.1.1.1 to 4.4.4.4, the next-hop IP address of the first route. During packet forwarding, first, the R1 sends a packet whose destination IP address is 10.1.9.9 to the RTB whose destination address is 4.4.4.4, and then the RTB forwards the packet to a network device whose IP address is 10.1.9.9.

In this embodiment of this application, when determining to update the next-hop IP address of the route in the third network device, the first network device sends, to the third network device, the second LSA packet that is used to trigger switching of the route's next-hop IP address to the IP address of the second network device, so that the third network device rapidly switches, to the IP address of the second network device, the next-hop IP address of the route that transmits the packet to the destination IP address. This achieves a purpose of improving a speed of route switching.

Based on the method for updating a route in a network in the foregoing embodiment of this application, optionally, after the route switching, the method further includes: sending, by the first network device to the third network device when the first LSA packet is stored in a link-state database for a time length reaching a maximum age, a packet for deleting the first LSA packet, so that the third network device deletes the stored first LSA packet. After sending the second LSA packet, the first network device may continue to perform an aging operation on the first LSA packet in the foregoing manner, to delete the first LSA packet, thereby saving storage space.

Optionally, the foregoing method for updating a route further includes the following steps:

The first network device sends a third LSA packet to the third network device, where the third LSA packet includes the first IP address, and the third LSA packet is used to trigger the third network device to generate a route whose destination address is the first IP address.

The second network device sends a fourth LSA packet to the third network device, where the fourth LSA packet includes the third IP address, and the fourth LSA packet is used to trigger the third network device to generate a route whose destination address is the third IP address.

The third network device receives the third LSA packet sent by the first network device, and generates, based on the third LSA packet, a first route whose destination address is a first IP address.

The third network device receives the fourth LSA packet sent by the second network device, and generates, based on the fourth LSA packet, a route whose destination address is the third IP address.

The first network device sends a second LSA packet to the third network device when determining that switching needs to be performed on a next hop of a route that is stored in the third network device, whose destination IP address belongs to the IP network segment, and whose next-hop IP address is the first IP address. That the second LSA packet is used to trigger the third network device to update, from the first IP address to the third IP address, the next-hop IP address of the first route is specifically as follows:

The second LSA packet is used to instruct the third network device to delete the route whose destination address is the first IP address, to trigger the third network device to update the first route whose next-hop IP address is the first IP address, so that the next-hop IP address of the first route is updated from the first IP address to the third IP address, where the third network device stores a route whose destination address is the third IP address.

The third network device updates, based on the second LSA packet, the first route whose next-hop IP address is the first IP address, so that the next-hop IP address of the first route is updated from the first IP address to the third IP address.

Optionally, the first IP address is an IP address of a logical interface of the first network device, and a forwarding address in the first LSA packet is the first IP address. A correspondence may be set up between the logical interface and one network segment, or a correspondence may be set up between the logical interface and a plurality of network segments. The first IP address includes a plurality of IP addresses. The IP address may be an IP address in a reserved network segment.

For example, the first network device may be the RTA or the RTB shown in FIG. 1.

For example, the first IP network segment and the second IP network segment are grouped into a route group (English: group) 1, and the third IP network segment is grouped to a group 2. The group 1 includes route prefix addresses 10.1.0.0 and 10.2.0.0. The group 2 includes a route prefix address 10.3.0.0.

It should be noted that this embodiment of this application does not limit a quantity of obtained route groups or limit a quantity of route prefix addresses in an IP network segment that are included in the route groups. Flexible grouping may be performed based on a specific requirement.

Based on the foregoing obtained route groups, each route group is corresponding to one logical interface. Each logical interface is corresponding to one IP address. Optionally, the logical interface may be a router loopback (English: Loopback) interface.

The first network device sets up a correspondence between the group 1 and a loopback interface 1. An IP address of the loopback interface 1 is 1.1.1.1. The first network device sets up a correspondence between the group 2 and a loopback interface 2. An IP address of the loopback interface 2 is 2.2.2.2.

For example, the first network device is the RTA shown in FIG. 1, and the first LSA packet is an AS-external-LSA packet. Based on a format of the AS-external-LSA packet shown in FIG. 3 and a correspondence between a group and a loopback, when generating the AS-external-LSA packet, the RTA determines an IP address of a logical interface corresponding to the route group. A forwarding address field in the AS-external-LSA packet is set to the IP address of the logical interface, and a link state ID field in the AS-external-LSA packet is set to a route prefix address in a currently based IP network segment.

The RTA generates a corresponding first AS-external-LSA packet based on a route prefix address 10.1.0.0 in the first IP network segment. A forwarding address field in the first AS-external-LSA packet is set to 1.1.1.1, and a link state ID field is set to 10.1.0.0.

The RTA generates a corresponding second AS-external-LSA packet based on a route prefix address 10.2.0.0 in the second IP network segment. A forwarding address field in the second AS-external-LSA packet is set to 1.1.1.1, and a link state ID field is set to 10.2.0.0.

The RTA generates a corresponding third AS-external-LSA packet based on a route prefix address 10.3.0.0 in the third IP network segment. A forwarding address field in the third AS-external-LSA packet is set to 2.2.2.2, and a link state ID field is set to 10.3.0.0.

For example, the first network device is the RTA shown in FIG. 1, and the second LSA packet is a Router-LSA packet. Based on a format of the Router-LSA packet shown in FIG. 2, with reference to the route groups to which the route prefix addresses of all the foregoing IP network segments belong, when the first network device generates a corresponding first Router-LSA packet based on an obtained route group, as described by the first network device, a quantity in a #links field is a quantity of links that need to be set up between the current first network device and an external network segment. A link ID field, a link data field, a type field, a #TOS field, and a metric field are link information corresponding to a logical interface of the route group.

There is a restriction for the network device to process a forwarding address in a route calculation process. The restriction is as follows: If a forwarding address of the AS-external-LSA packet is non-zero, a routing table is searched for a route that is corresponding to the forwarding address. A matched routing entry needs to be an intra-area route or an inter-area route in an OSPF area. If no match is found, a destination prefix address of the LSA advertisement is not calculated. If a matched route can be found, the forwarding address is set to a next hop of a destination prefix address.

Therefore, when the first network device generates the first Router-LSA packet, a type field included in the link information of the logical interface is set to the third type, that is, the link type is a link to a stub network.

For example, when the first network device is the RTA shown in FIG. 1, a connected external network has three IP network segments, and route prefix addresses of the three IP network segments are 10.1.0.0, 10.2.0.0, and 10.3.0.0. For example, 10.1.0.0 and 10.2.0.0 belong to a group 1, and an IP address of a loopback interface 1 corresponding to the group 1 is 1.1.1.1; 10.3.0.0 belongs to a group 2, and an IP address of a loopback interface 2 corresponding to the group 2 is 2.2.2.2.

When the RTA generates the first Router-LSA packet, a quantity in a #links field is 2. Each loopback interface is corresponding to a section of packet content that includes a link ID field, a link data field, a type field, a #TOS field, and a metric field.

When the first network device is the RTB shown in FIG. 1, a process of generating the corresponding first Router-LSA packet based on the route group is the same as a process in which the RTA generates the first Router-LSA packet. Details are not described herein again.

For example, the third network device may be the R1, the R2, the R3, or the R4 shown in FIG. 1.

The first route that reaches a destination IP address and that is generated by the third network device based on an AS-external-LSA packet includes: a route whose next-hop address is 1.1.1.1 and a route whose next-hop address is 2.2.2.2. The destination IP address is the second IP address and belongs to the IP network segment. For example, a destination address 10.1.9.9 belongs to the first IP network segment and belongs to the group 1; a destination IP address 10.2.4.4 belongs to the second IP network segment and belongs to the group 1; and the destination address 10.3.2.2 belongs to the third IP network segment and belongs to the group 2.

When the first network device determines that a next-hop address of a route from the third network device to the destination IP address needs to be updated from the IP address of the first network device to the IP address of the second network device, optionally, the first network device may exchange link state data through flooding (English: Flooding) method.

For example, in an OSPF network area, flooding indicates that a router transfers an LSA packet of the router to all of its neighboring OSPF routers, and the neighboring routers update their respective databases based on received link state information, and forwards the link state information to their neighboring routers. When a network is re-stabilized, in other words, after an OSPF routing protocol is updated, all the routers calculate their respective routing tables based on their respective link state information databases. The routing table includes costs spent when the packet is transferred from the router to each reachable destination and a next router to which the packet is forwarded before reaching the destination.

For example, the first network device is the RTA shown in FIG. 1, the second network device is the RTB shown in FIG. 1, the third network device is the R1 shown in FIG. 1, and the R1 has 10000 routes to a network segment corresponding to a route prefix address 10.3.0.0. The RTA needs to update, to the RTB, the 10000 routes on the R1 that reach the network segment corresponding to the route prefix address 10.3.0.0.

In this case, the RTA floods first Router-LSA packets that are continuously sent to the R1. Based on the foregoing examples, the RTA determines that the destination IP address 10.3.2.2 belongs to the group 2, and an interface corresponding to the group 2 is a loopback interface 2. Therefore, the flooding performed by the RTA is updating, to an IP address of the RTB, an IP address of the loopback interface 2 in the first Router-LSA packet, to generate a second Router-LSA packet.

The R1 re-calculates a route based on the second Router-LSA packet obtained after the first Router-LSA packet is updated. Because the second Router-LSA packet does not include the IP address of the loopback interface 2, but includes the updated IP address of the RTB, the re-calculated route no longer includes a route to an area of 2.2.2.2, and no route to the destination IP address 10.3.2.2 is calculated again, but the destination IP address 10.3.2.2 is updated to the RTB.

In this embodiment of this application, the first network device communicating with the external network divides the route prefix addresses in the IP network segments into route groups, to flexibly adjust a route in a network system, and improve flexibility of network deployment. In addition, the second LSA packet sent to the third network device in the network area is flooded, so that the third network device switches, to the IP address of the second network device, the next-hop IP address of the route whose next-hop IP address is the first IP address. In this way, one LSA packet is sent to enable the third network device to switch, from the first network device to the second network device, the next hop of the route belonging to the IP network segment, and there is no need to send an LSA packet for each to-be-updated route. This avoids occupation of excessive bandwidths during a route update and improves a speed of the route update.

Based on the method for updating a route in a network in the foregoing embodiment of this application, an embodiment of this application further correspondingly discloses a network device for performing the method for updating a route in a network.

Figure 5:
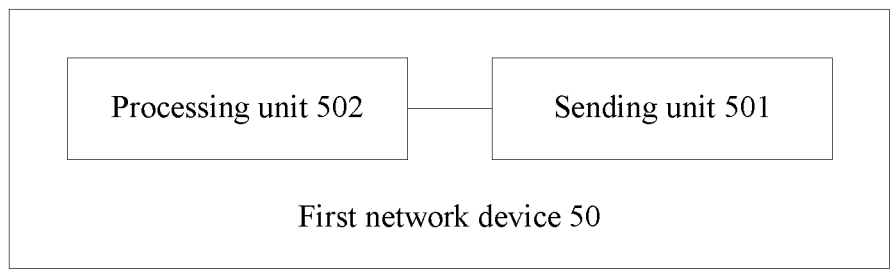
FIG. 5 is a schematic structural diagram of a first network device according to an embodiment of this application.

As shown in FIG. 5, a first network device 50 disclosed in an embodiment of this application, a second network device, and a third network device are in a same network. The third network device is connected to the first network device and the second network device. The first network device 50 includes:

a processing unit 502, configured to set up a correspondence between an IP network segment and a first IP address, where the first IP address is an IP address of the first network device; and a sending unit 501, configured to send a first LSA packet to the third network device, where the first LSA packet includes the second IP address, the first LSA packet is used to trigger the third network device to generate a first route whose destination address is the second IP address, the second IP address belongs to the IP network segment, and a next-hop IP address of the first route is the first IP address.

The processing unit 502 is configured to determine whether switching needs to be performed on a next hop of a route that is stored in the third network device, whose destination IP address belongs to the IP network segment, and whose next-hop IP address is the first IP address.

The sending unit 501 is configured to send a second LSA packet to the third network device when the processing unit determines that switching needs to be performed on the next hop of the route that is stored in the third network device, whose destination IP address belongs to the IP network segment, and whose next-hop IP address is the first IP address, where the second LSA packet includes the first IP address, the second LSA packet is used to trigger the third network device to update, from the first IP address to a third IP address, the next-hop IP address of the first route, and the third IP address is an IP address of the second network device.

Optionally, the sending unit 501 is further configured to send a third LSA packet to the third network device, where the third LSA packet includes the first IP address, and the third LSA packet is used to trigger the third network device to generate a route whose destination address is the first IP address.

Correspondingly, the second LSA packet is used to instruct the third network device to delete the route whose destination address is the first IP address, to trigger the third network device to update the first route whose next-hop IP address is the first IP address, so that the next-hop IP address of the first route is updated from the first IP address to the third IP address, where the third network device stores a route whose destination address is the third IP address.

For execution processes of the units in the first network device disclosed in the foregoing embodiment of this application, refer to the description related to the first network device in the foregoing method for updating a route in a network in the embodiments of this application. A principle and an execution manner in this embodiment are the same as those in the foregoing embodiments. Details are not described herein again.

Based on the method for updating a route in a network in the foregoing embodiment of this application, an embodiment of this application further correspondingly discloses a third network device for performing the method for updating a route in a network.

Figure 6:
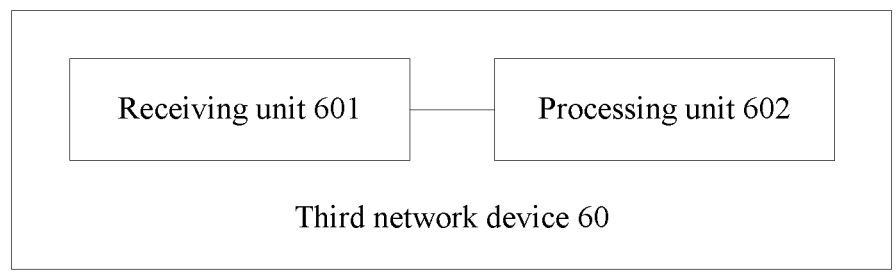
FIG. 6 is a schematic structural diagram of a third network device according to an embodiment of this application.

FIG. 6 shows a third network device 60 according to an embodiment of this application, including:

a receiving unit 601, configured to: receive a first LSA packet sent by the first network device, where the first LSA packet includes a second IP address, the second IP address belongs to the Internet Protocol IP network segment; and receive a second LSA packet sent by the first network device, where the second LSA packet is sent to the third network device when the first network device determines that switching needs to be performed on a next hop of a route that is stored in the third network device, whose destination IP address belongs to the IP network segment, and whose next-hop IP address is the first IP address, and the second LSA packet includes the first IP address; and a processing unit 602, configured to generate, based on the first LSA packet, a first route whose destination address is the second IP address, and a next-hop IP address of the first route is the first IP address, and update, from the first IP address to a third IP address, the next-hop IP address of the first route based on the second LSA packet, where the third IP address is an IP address of the second network device.

Optionally, the receiving unit 601 is further configured to receive a third LSA packet sent by the first network device, where the third LSA packet includes the first IP address. The processing unit 602 is further configured to generate, based on the third LSA packet, a route whose destination address is the first IP address.

Correspondingly, the receiving unit 601 is further configured to receive a fourth LSA packet sent by the second network device, where the fourth LSA packet includes the third IP address.

The processing unit 602 is further configured to generate, based on the fourth LSA packet, a route whose destination address is the third IP address.

For execution processes of the units in the third network device disclosed in the foregoing embodiment of this application, refer to the description related to the third network device in the foregoing method for updating a route in a network in the embodiments of this application. A principle and an execution manner in this embodiment are the same as those in the foregoing embodiments. Details are not described herein again.

With reference to the method for updating a route in a network in the embodiments of this application, the first network device and the third network device disclosed in the embodiments of this application may also be implemented directly by using hardware, a memory executed by a processor, or a combination thereof.

Figure 7:
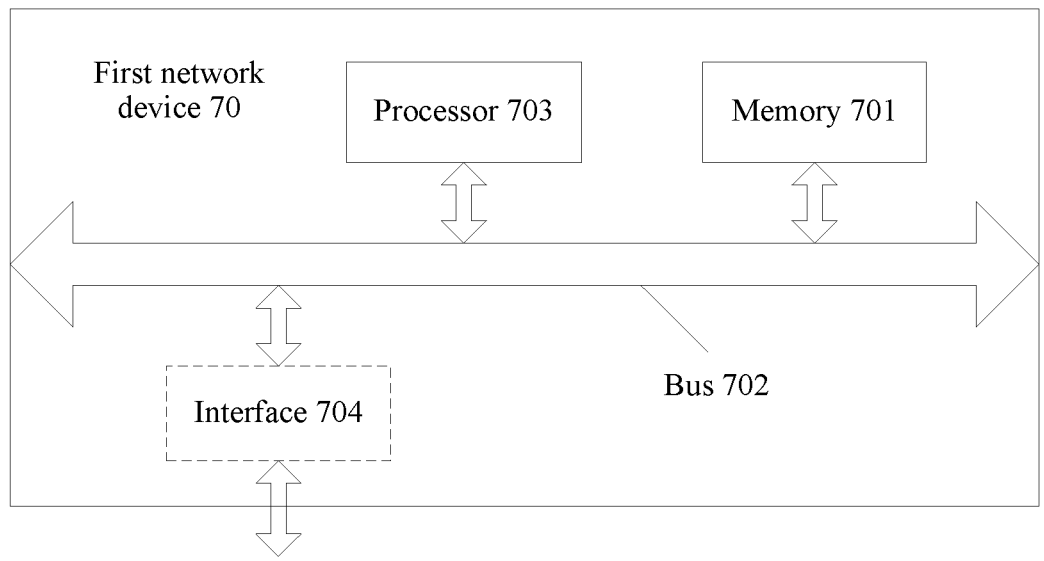
FIG. 7 is a schematic structural diagram of another first network device according to an embodiment of this application.
Figure 8:
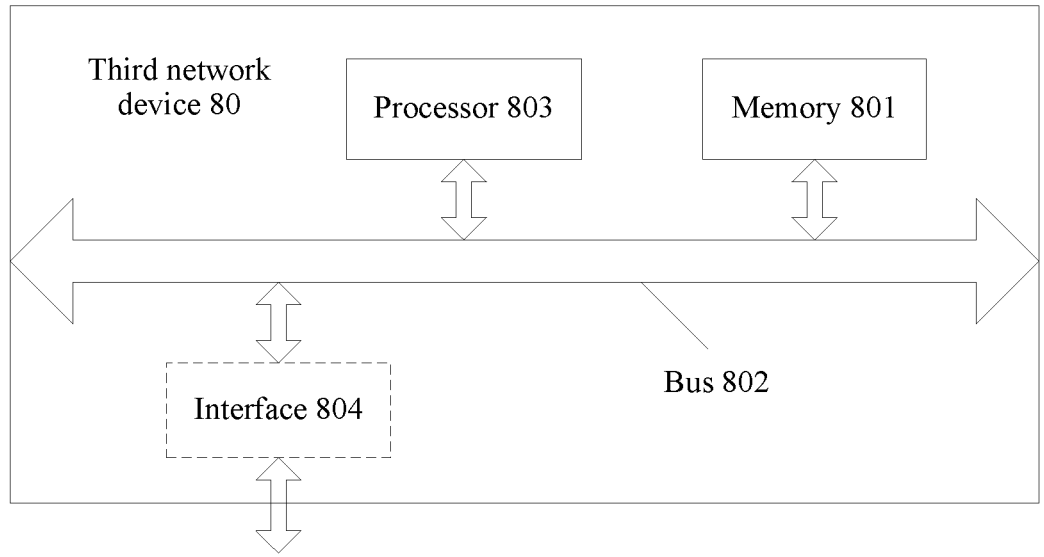
FIG. 8 is a schematic structural diagram of another third network device according to an embodiment of this application.

Therefore, based on the method for updating a route in a network in FIG. 4, an embodiment of this application further correspondingly discloses a first network device 70 shown in FIG. 7 and a third network device 80 shown in FIG. 8. The first network device 70 shown in FIG. 7 may be the first network device in the embodiment corresponding to FIG. 4 and can perform the method that is for updating a route in a network and that is related to the first network device in FIG. 4 and the foregoing embodiments. The third network device 80 shown in FIG. 8 may be the third network device in the embodiment corresponding to FIG. 4 and can perform the method that is for updating a route in a network and that is related to the third network device in FIG. 4 and the foregoing embodiments.

As shown in FIG. 7, the network device 70 includes: a memory 701, a bus 702, a processor 703, and an interface 704. The interface 704 may be implemented in a wireless or wired manner, and specifically, may be a component such as a network interface card. The memory 701, the processor 703, and the interface 704 are connected by using the bus 702.

The interface 704 may specifically include a transmitter and a receiver, and may be configured to receive and transmit a packet between the first network device and the foregoing third network device in the foregoing embodiments of this application. For a detailed process, refer to a corresponding part related to packet receiving and sending of the first network device in the foregoing embodiments of this application. Details are not described herein again.

The processor 703 is configured to perform a route update performed by the first network device in a network in the foregoing embodiments. For a detailed process, refer to the foregoing embodiments of this application. Details are not described herein again.

The memory 701 includes an operating system and an application program, and is configured to store an operation program, code, or an instruction for updating a route in a network. When the processor 703 or a hardware device updates a route, these programs, code, or instructions can be invoked and executed to complete the related process in which the first network device updates the route in FIG. 4 and the foregoing embodiments. For a detailed process, refer to a corresponding part in the foregoing embodiments of this application. Details are not described herein again.

It may be understood that FIG. 7 merely shows a simplified design of the first network device. In an actual application, the first network device may include any quantity of interfaces, processors, memories, and the like. All first network devices that can implement this application fall within the protection scope of this application.

In addition, an embodiment of this application provides a computer storage medium, which is configured to store a computer software instruction used by the foregoing first network device and includes a related program used to perform FIG. 4 and the foregoing embodiments.

FIG. 8 is a schematic diagram of a hardware structure of a third network device 80 according to an embodiment of this application. The third network device 80 shown in FIG. 8 may perform corresponding steps performed by the third network device in the foregoing embodiments of this application.

As shown in FIG. 8, the third network device 80 includes: a memory 801, a bus 802, a processor 803, and an interface 804. The interface 804 may be implemented in a wireless or wired manner, and specifically, may be a component such as a network interface card. The memory 801, the processor 803, and the interface 804 are connected by using the bus 802.

The interface 804 may specifically include a transmitter and a receiver, and may be configured to receive and transmit a packet between the third network device and each of the foregoing first network device and second network device in the foregoing embodiments of this application. For example, for a detailed process of the interface 804, refer to a corresponding part about packet receiving and sending between the third network device and each of the first network device and the second network device in the foregoing embodiments of this application. Details are not described herein again.

The processor 803 is configured to perform the route update performed by the third network device in the foregoing embodiments. For example, the processor 803 is configured to perform a corresponding operation based on a received LSA packet. For a detailed process, refer to a corresponding part in the foregoing embodiments of this application. Details are not described herein again.

The memory 801 includes an operating system and an application program, and is configured to store a program, code, or an instruction for updating a route. When the processor 803 or a hardware device updates a route, these programs, code, or instructions can be invoked and executed to complete the processing process related to the third network device in FIG. 4 and the foregoing embodiments. For a detailed process, refer to a corresponding part in the foregoing embodiments of this application. Details are not described herein again.

It may be understood that FIG. 8 merely shows a simplified design of the third network device. In an actual application, the third network device may include any quantity of interfaces, processors, memories, and the like. All third network devices that can implement this application fall within the protection scope of this application.

In addition, an embodiment of this application provides a non-volatile computer readable storage medium, which is configured to store a computer software instruction used by the foregoing third network device and includes a related program used to perform FIG. 4 and the foregoing embodiments.

Figure 9:
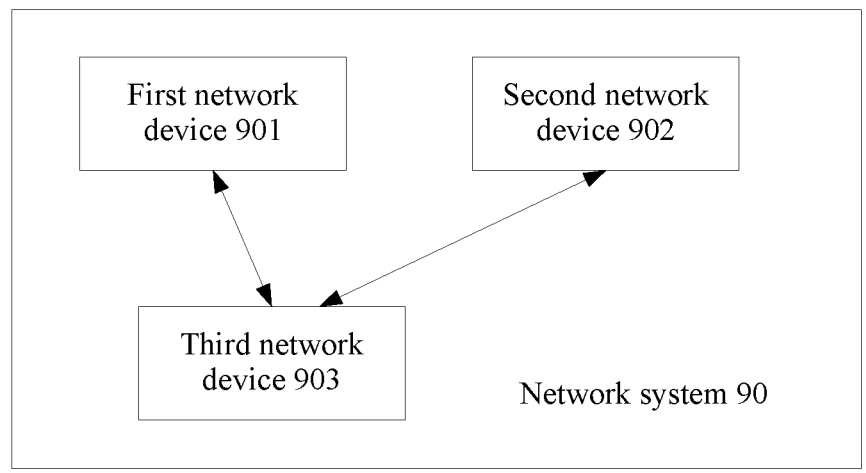
FIG. 9 is a schematic structural diagram of a network system according to an embodiment of this application.

FIG. 9 shows a network system 90 used for implementing a method for updating a route in a network according to an embodiment of this application. The network system 90 mainly includes a first network device 901, a second network device 902, and a third network device 903.

In the network system disclosed in this embodiment of this application, the first network device 901 may be specifically the first network device disclosed in FIG. 5 and FIG. 7. For a detailed process and execution principle, refer to the foregoing description. Details are not described herein again.

The second network device 902 is configured to forward a packet sent by the third network device 903. Optionally, the second network device 902 and the first network device 901 have a same function.

In the network system disclosed in this embodiment of this application, the third network device 903 may be specifically the third network device disclosed in FIG. 6 and FIG. 8. For a detailed process and execution principle, refer to the foregoing description. Details are not described herein again.

In conclusion, according to the method for updating a route in a network in the embodiments of this application, the first network device sends a first LSA packet to the third network device, so that the third network device generates a first route whose destination address is a second IP address, where a next-hop IP address of the first route is an IP address of the first network device, and the second IP address belongs to an IP network segment. When determining to update a next-hop IP address of a route in the third network device, the first network device sends, to the third network device, a second LSA packet that is used to trigger switching of the route's next-hop IP address to an IP address of the second network device, so that the third network device rapidly switches, to the IP address of the second network device, the next-hop IP address of the route whose next-hop IP address is a first IP address. In this way, one LSA packet is sent to enable the third network device to switch, from the first network device to the second network device, the next hop of the route belonging to the IP network segment, and there is no need to send an LSA packet for each to-be-updated route. This avoids occupation of excessive bandwidths during a route update and improves a speed of the route update.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

Finally, it should be noted that the foregoing embodiments are merely intended to describe the technical solutions of this application as an example, but not to limit this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A method for updating a route in a network, the method comprising:
    sending, by a first network device of the network, a first link state advertisement (LSA) packet to a third network device of the network, wherein the first LSA packet comprises a second internet protocol (IP) address that belongs to an IP network segment, and is to trigger the third network device to generate a first route whose destination address is the second IP address, and whose next-hop IP address is a first IP address that is an IP address of the first network device; and
    sending, by the first network device, a second LSA packet to the third network device, wherein the second LSA packet comprises the first IP address, and is to trigger the third network device to update the next-hop IP address of the first route to a third IP address that is an IP address of a second network device of the network, wherein the third network device is connected to the first network device and the second network device of the network.

2. The method according to claim 1, the method further comprising:
    setting up, by the first network device, a correspondence between the IP network segment and the first IP address, wherein the IP network segment that the second IP address belongs to is different from an IP network segment that an IP address of the third network device belongs to.

3. The method according to claim 2, the method further comprising:
    the second LSA packet is sent when the first network device determines that switching needs to be performed on a next hop of a route that is stored in the third network device, whose destination IP address belongs to the IP network segment that the second IP address belongs to, and whose next-hop IP address is the first IP address.

4. The method according to claim 3, the method further comprising:
    sending, by the first network device, a third LSA packet to the third network device, wherein the third LSA packet comprises the first IP address, and is to trigger the third network device to generate a route whose destination address is the first IP address; and correspondingly,
    wherein the second LSA packet is used to trigger the third network device to update the next-hop IP address of the first route to the third IP address comprises:
        instructing, by the second LSA packet, the third network device to delete the route whose destination address is the first IP address, to trigger the third network device to update the first route whose next-hop IP address is the first IP address, so that the next-hop IP address of the first route is updated from the first IP address to the third IP address, wherein the third network device stores a route whose destination address is the third IP address.

5. The method according to claim 2, wherein:
    the first IP address is an IP address of a logical interface of the first network device, and a forwarding address in the first LSA packet is the first IP address.

6. The method according to claim 3, wherein:
    the first IP address is an IP address of a logical interface of the first network device, and a forwarding address in the first LSA packet is the first IP address.

7. A route switching method in a network, the method comprising:
    receiving, by a third network device of the network, a first link state advertisement (LSA) packet sent by a first network device of the network, wherein the first LSA packet comprises a second internet protocol (IP) address that belongs to a IP network segment;
    generating, by the third network device based on the first LSA packet, a first route whose destination address is the second IP address, and whose next-hop IP address is a first IP address that is an IP address of the first network device;
    receiving, by the third network device, a second LSA packet sent by the first network device, wherein the second LSA packet comprises the first IP address; and
    updating, by the third network device, the next-hop IP address of the first route to a third IP address based on the second LSA packet, wherein the third IP address is an IP address of a second network device of the network, wherein the third network device is connected to the first network device and the second network device.

8. The method according to claim 7, wherein the second LSA packet is received from the first network device when the first network device determines that switching needs to be performed on a next hop of a route that is stored in the third network device, whose destination IP address belongs to the IP network segment, and whose next-hop IP address is the first IP address.

9. The method according to claim 8, the method further comprising:
    receiving, by the third network device, a third LSA packet sent by the first network device, wherein the third LSA packet comprises the first IP address; and generating, by the third network device based on the third LSA packet, a route whose destination address is the first IP address; and correspondingly, wherein the updating, by the third network device, the next-hop IP address of the first route to a third IP address based on the second LSA packet comprises:

receiving, by the third network device, a fourth LSA packet sent by the second network device, wherein the fourth LSA packet comprises the third IP address;

generating, by the third network device based on the fourth LSA packet, a route whose destination address is the third IP address; and updating, by the third network device based on the second LSA packet, the first route whose next-hop IP address is the first IP address, so that the next-hop IP address of the first route is updated from the first IP address to the third IP address.

10. The method according to claim 8, wherein:
the first IP address is an IP address of a logical interface of the first network device, and a forwarding address in the first LSA packet is the first IP address.

11. The method according to claim 9, wherein:
the first IP address is an IP address of a logical interface of the first network device, and a forwarding address in the first LSA packet is the first IP address.

12. A first network device in a network, comprising:
a memory storing instructions; and
a processor coupled to the memory, wherein the instructions are executed by the processor to cause the first network device to:
send a first link state advertisement (LSA) packet to a third network device of the network, wherein the first LSA packet comprises a second internet protocol (IP) address that belongs to an IP network segment, wherein the first LSA packet is to trigger the third network device to generate a first route whose destination address is the second IP address, and whose next-hop IP address is a first IP address that is an IP address of the first network device; and
send a second LSA packet to the third network device, wherein the second LSA packet comprises the first IP address, wherein the second LSA packet is to trigger the third network device to update the next-hop IP address of the first route to a third IP address that is an IP address of a second network device of the network, wherein the third network device is connected to the first network device and the second network device.

13. The first network device according to claim 12, wherein the instructions are executed by the processor to further cause the first network device to:
set up a correspondence between the IP network segment and the first IP address, wherein the IP network segment is different from an IP network segment that an IP address of the third network device belongs to.

14. The first network device according to claim 13, the instructions are executed by the processor to further cause the first network device to:
send a third LSA packet to the third network device, wherein the third LSA packet comprises the first IP address, and is to trigger the third network device to generate a route whose destination address is the first IP address; and correspondingly,
wherein the second LSA packet is to instruct the third network device to delete the route whose destination address is the first IP address, to trigger the third network device to update the first route whose next-hop IP address is the first IP address, so that the next-hop IP address of the first route is updated from the first IP address to the third IP address, wherein the third network device stores a route whose destination address is the third IP address.

15. The first network device according to claim 12, wherein the first IP address is an IP address of a logical interface of the first network device, and a forwarding address in the first LSA packet is the first IP address.

16. The first network device according to claim 13, wherein the first IP address is an IP address of a logical interface of the first network device, and a forwarding address in the first LSA packet is the first IP address.

17. A third network device in a network, the third network device comprising:
a memory storing instructions; and
a processor coupled to the memory, wherein the instructions are executed by the processor to cause the third network device to:
receive a first LSA packet sent by a first network device of the network, wherein the first LSA packet comprises a second IP address that belongs to a IP network segment;
generate, based on the first LSA packet, a first route whose destination address is the second IP address, and whose next-hop IP address is a first IP address that is an IP address of the first network device;
receive a second LSA packet sent by the first network device, wherein the second LSA packet comprises the first IP address; and
update the next-hop IP address of the first route to a third IP address based on the second LSA packet, wherein the third IP address is an IP address of a second network device of the network, wherein the third network device is connected to the first network device and the second network device.

18. The third network device according to claim 17, wherein the second LSA packet is received from the first network device when the first network device determines that switching needs to be performed on a next hop of a route that is stored in the third network device, whose destination IP address belongs to the IP network segment, and whose next-hop IP address is the first IP address.

19. The third network device according to claim 17, wherein the instructions are executed by the processor to further cause the first network device to:
receive a third LSA packet sent by the first network device, wherein the third LSA packet comprises the first IP address;
generate, based on the third LSA packet, a route whose destination address is the first IP address;
receive a fourth LSA packet sent by the second network device, wherein the fourth LSA packet comprises the third IP address;
generate, based on the fourth LSA packet, a route whose destination address is the third IP address; and
update, based on the second LSA packet, the first route whose next-hop IP address is the first IP address, so that the next-hop IP address of the first route is updated from the first IP address to the third IP address.

20. The third network device according to claim 17, wherein the first IP address is an IP address of a logical interface of the first network device, and a forwarding address in the first LSA packet is the first IP address.

* * * * *